United States Patent [19]
Gast et al.

[11] Patent Number: 4,760,258
[45] Date of Patent: Jul. 26, 1988

[54] OPTICAL INSTRUMENT

[75] Inventors: Jürgen Gast, Rheinstetten; Arno Simon, Karlsruhe, both of Fed. Rep. of Germany

[73] Assignee: Bruker Analytische Messtechnik GmbH, Fed. Rep. of Germany

[21] Appl. No.: 924,067

[22] Filed: Oct. 28, 1986

[30] Foreign Application Priority Data

Nov. 8, 1985 [DE] Fed. Rep. of Germany ....... 3539667

[51] Int. Cl.⁴ ............................................ G01N 21/35
[52] U.S. Cl. ...................................... 250/347; 250/339
[58] Field of Search ............. 250/347, 334, 351, 339, 250/345; 356/323, 325, 343; 358/206, 208

[56] References Cited

U.S. PATENT DOCUMENTS

| 3,488,122 | 1/1970 | Roussopoulus | 356/323 |
| 4,371,785 | 2/1983 | Pederson | 250/345 |
| 4,422,766 | 12/1983 | Skukalek | 356/445 |
| 4,525,627 | 6/1985 | Krempl et al. | 250/345 |

FOREIGN PATENT DOCUMENTS

| 1207113 | 5/1963 | Fed. Rep. of Germany . |
| 6809367 | 11/1968 | Fed. Rep. of Germany . |
| 2321736 | 4/1973 | Fed. Rep. of Germany . |
| 2423255 | 5/1974 | Fed. Rep. of Germany . |
| 2507935 | 2/1975 | Fed. Rep. of Germany . |
| 2938742 | 9/1979 | Fed. Rep. of Germany . |
| 3025418 | 7/1980 | Fed. Rep. of Germany . |
| 3211722 | 3/1982 | Fed. Rep. of Germany . |

Primary Examiner—Carolyn E. Fields
Assistant Examiner—John A. Miller
Attorney, Agent, or Firm—Harness, Dickey & Pierce

[57] ABSTRACT

In an IR-FR- spectrometer, a light beam (10) is guided from a source to a detector (31) and is passed, in a first mode of operation, by means of first optical means (12, 19, 20) through a sample to be measured (28) and, in a second mode of operation, by second optical means (12, 22, 21) through a reference sample (32). The first and second optical means comprise a common mirror element (12) having at least first and second mirror surfaces (13, 14, 15, 16) which are inclined relative to each other. The mirror surfaces abut in at least one point. There is provided means for moving the mirror element (12) relative to the light beam so that during such relative movement the impinging point of the light beam (10) is displace from the first mirror surface (13), over onto the second mirror surface (14).

6 Claims, 2 Drawing Sheets

OPTICAL INSTRUMENT

The present invention relates to an optical instrument in which a light beam is guided, in a first mode of operation, by means of first optical means to a sample to be measured and over to the detector, while in a second mode of operation it is guided by means of second optical means to a reference sample and over to the detector, said first and said second optical means comprising a common mirror element having at least two mirror surfaces being inclined relative to each other and abutting in at least one common point, and which comprises further means for displacing the light beam and the mirror element relative to each other in a manner such that during the relative movement the impinging point of the light beam is displaced from a first mirror surface over that point onto a second adjacent mirror surface.

An instrument of this type has been known already from German Patent Publication No. 12 07 113.

Further it has been known, for example in Fourier transform infrared spectrometry, to examine alternately a sample to be measured and a reference sample in order to determine the specific differences between the sample to be measured and the reference sample by way of the standardized values thus obtained.

However, when guiding the light beam from the one sample to the other, a considerable variation in luminous intensity is encountered in the area of the detector in the known spectrometers. The detectors used in such optical spectrometers are, however, usually very sensitive to permit high-precision measurements, and this leads on the other hand to prolonged recovery times which are needed to change over from one luminous condition to another luminous condition.

In the case of the usual luminous intensities and detectors of the type used in infrared spectrometry, the recovery time required between the condition "full light" and the condition "no light", or vice versa, may be in the range of one or several seconds so that the overall measuring time is doubled by these "recovery times".

The before-mentioned German Patent Publication No. 12 07 113 describes a photometer using a rotating polygonal mirror element. The photometer comprises a light source, a polygonal mirror element arranged to rotate about an axis extending perpendicularly to the optical axis, a convex lens and a detector, all arranged successively along the optical axis. On both sides of the optical axis there are provided, in mirror-symmetrical arrangement relative to said axis, first and second optical means, respectively. In a first, very narrow angular sector of the rotary movement of the polygonal mirror element, the light beam impinging upon the lateral surface is directed initially onto a focusing mirror which parallelizes the light beam. The parallelized light beam is then passed through a reference sample, deflected by two plane deflection mirrors and finally directed upon the lateral surface symmetrically opposite the first reflecting lateral surface of the polygonal mirror element, and further along the optical axis through a convex lens and then upon the detector. In a second, likewise very limited angular sector of the rotary movement, the light beam is guided along a mirror-symmetrical path through the second optical means and, finally, onto the detector arranged in the optical axis. Instead of the reference sample, however, a sample to be measured is arranged in the path through which the light beam is guided by the second optical means. So, when the polygonal mirror rotates quickly and continuously, the light beam passes alternately the reference sample and the sample to be measured, while in both cases the light beam is finally guided to one and the same detector.

However, it is a drawback of the known photometer that during rotation of the polygonal mirror the light beam is guided over the first and the second optical means for a very short time only, i.e. during rotation through the very limited angular sector of the rotary movement described before, so that light impinges upon the sample to be measured and the reference sample, and upon the detector, too, only momentaneously in the form of pulses. In all the other rotary positions of the polygonal mirror, the light beam is guided past the first or second optical means, respectively, into the open air.

The known photometer thus offers the disadvantage described above, namely that the detector is exposed, in pulse-like manner, to the conditions "full light" and "no light" so that in view of the very long recovery times of sensitive infrared detectors measurements at high rotary speeds of the polygonal mirror would actually be impossible, while low rotary speeds would lead to extremely long overall measuring times.

Now, it is the object of the present invention to improve an optical instrument of the type described above in such a manner that it can be used as an infrared spectrometer in which the detector is not exposed to high variations in luminous intensity, even when fading over from a sample to be measured to a reference sample, so that comparative measurement of the described type can be carried out in rapid succession.

According to the invention, this object is achieved by the fact that the instrument is an infrared spectrometer, that the mirror can be displaced along an axis extending perpendicularly to the axis of the light beam, and that the first and the second optical means are designed in such a manner that during transition from the first mirror surface to the second mirror surface, the light beam is faded over continuously from the reference sample to the sample to be measured.

This solves the object underlying the invention fully and perfectly.

The invention permits smooth fading over from the sample to be measured to the reference sample, or vice versa, by a simple relative movement between the mirror and the light beam, the portion of the light beam reaching the detector through one sample being reduced in this purely geometrical, optical manner at the same rate at which the portion of the light reaching the detector through the other sample, via the other path, increases. If one disregards the different transmission or reflection properties of the two samples, the resulting light intensity obtained in the area of the detector remains, therefore, constant. Another advantage of this arrangement is seen in the fact that one of the parts, for example the mirror element, has to be displaced only to achieve soft fading over.

It is an additional advantage of the invention that due to the moveable arrangement of the mirror element, and the fixed arrangement of the light source emitting the light beam, only a small portion of the spectrometer has to be moveable which permits the use of high-precision guides and feed motions. In addition, the linear displacement of the mirror element along an axis extending perpendicularly to the edge provides the advantage, compared with the rotary movement of the mirror element about an axis extending parallel to the edge, that the direction of the beams reflected in full or in part by the individual mirror surfaces remains unchanged and that, accordingly, any additional deflection mirrors or the like that may be necessary can be provided in fixed arrangement. In addition, it is ensured by this arrangement that the angle of deflection remains constant during the displacement, whereas in the case of rotary movements a reference mark and a stop would be required and these would provide a risk of disadjustment. The stability of the angle of deflection is of particular importance when balancing the two measuring channels of a dual-beam spectrometer.

Considering, however, that the transmission or reflection properties of the reference sample can be adjusted in the conventional manner to values similar to those of the sample to be measured, if necessary with the aid of so-called wedge filters or the like, the resulting differences in luminous intensity obtained when fading over from the one mode of operation to the other are very low so that measurements can be carried out as desired in rapid succession.

According to a preferred embodiment of the invention, the mirror surfaces abut along an edge.

This feature provides the advantage that no excessive demands are placed on the precision with which the light beam is guided and on the relative movement between the mirror element and the light beam, the transition area between the two mirror surfaces being relatively large.

According to a further improvement of this embodiment of the invention, the mirror element can be displaced along an axis extending perpendicularly to the said edge.

In another embodiment of the invention, the mirror surfaces abut in one point only and the mirror element can be displaced along an axis which extends in the plane of the mirror surfaces and which, therefore, also passes the said point.

This feature may prove advantageous in certain applications where the movement of the mirror element in only one spatial direction is preferred because of certain limitations of the space available. Further it is an advantage that the angle of deflection can be adjusted and that no translation of the measuring focus occurs during fading over.

Finally, the two described embodiments of the invention can, preferably, be improved according to the invention by an arrangement in which the mirror element exhibits a rhombic cross-section in the direction of the axis of the light beam, and is provided on each side with a pair of mirror surfaces, so that in the first mode of operation the light beam is guided from one mirror surface of the one pair of mirror surfaces via a first deflection mirror, the sample to be measured, a second deflection mirror, one mirror surface of the other pair of mirror surfaces and finally onto the detector, while in the other mode of operation the light beam is guided from the other mirror surface of the one pair of mirror surfaces via a third deflection mirror, the reference sample, a fourth deflection mirror, and the mirror surface of the other pair of mirror surfaces onto the detector.

These features provide the advantage that all optical elements, just as the two samples and the detector, can be arranged within very limited space which permits compact spectrometers with multiple deflection of the light beam to be realized.

Finally, it is possible in the manner described before to provide wedge filters to reduce the light intensity of the beam and/or partial beam guided through the sample to be measured, in response to the optical properties of the sample to be measured.

Other advantageous of the invention will become apparent from the following specification and the attached drawing.

It is understood that the features that have been mentioned before and that will be described below may be used not only in the stated combination, but also in any other combination or individually without leaving the scope of the present invention.

Certain embodiments of the invention will now be described with reference to the drawing in which.

Figure 1A:
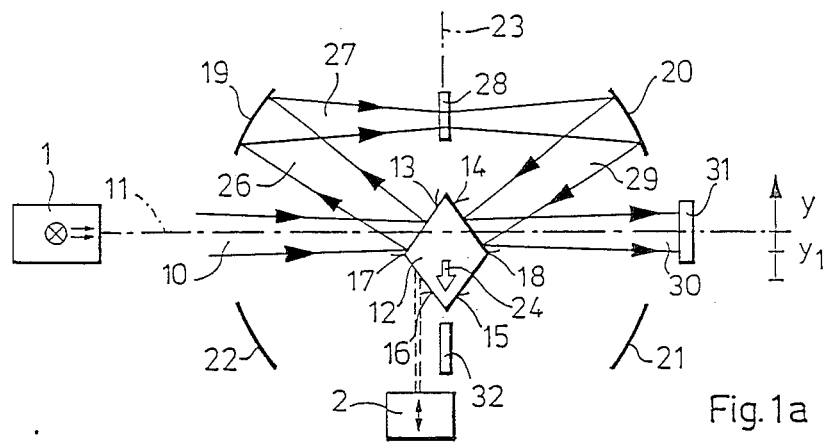
FIGS. 1a to 1c show one embodiment of a spectrometer according to the invention in the first mode of operation, an intermediate position and the second mode of operation, respectively.
Figure 1B:
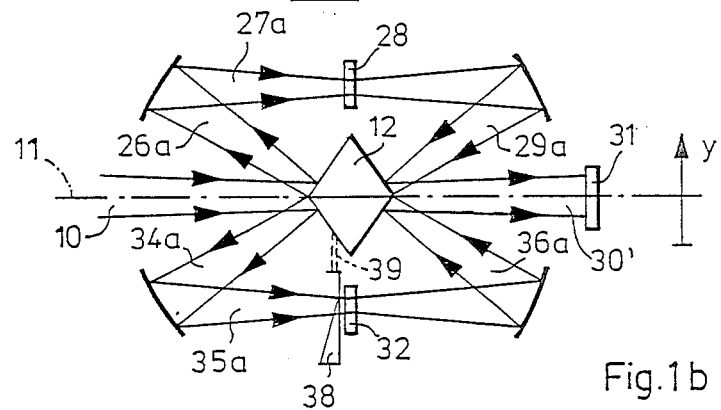
Figure 1C:
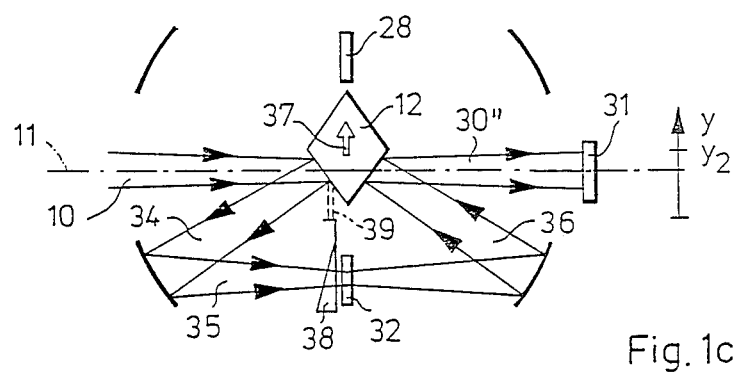

In FIGS. 1a to 1c, reference numeral 10 indicates an incoming light beam emanating from the light source 1 and entering an optical spectrometer, in particular an infrared spectrometer, in parallel and symmetrically to an axis 11. The incoming light beam 10 impinges upon a mirror element 12, the plane section of which exhibits a rhombic shape, and which comprises a first mirror surface 13, a second mirror surface 14, a third mirror surface 15 and a fourth mirror surface 16. The mirror element 12 can be displaced along one axis, preferably vertically to the axis of the light beam 10, by suitable drive means 2, for example a spindle. The mirror surfaces 13 to 16 are arranged in such a manner that each pair 13/16 and 14/15 thereof abuts in an edge 17 and 18, respectively. In addition, the pairs 13/16 and 14/15 of the mirror surface are provided in mirror-symmetrical arrangement relative to the axis 11 and an axis 23 extending perpendicularly thereto.

The mirror element 12 is surrounded by a first deflection mirror 19, a second deflection mirror 20, a third deflection mirror 21 and a fourth deflection mirror 22. The deflection mirrors 19 to 22 are also arranged symmetrically to the axes 11 and 23, and are designed, preferably, as focussing mirrors.

In the representation of FIG. 1a, the mirror element 12 is displaced a little from its point-symmetrical position, i.e. from the point of intersection between the axes 11, 23, as indicated by arrow 24.

This position of the mirror element 12 causes the incoming light beam 10 to impinge upon a mirror surface 13 where it is reflected as a light beam 26 and directed upon the first deflection mirror 19 from where it is reflected as a light beam 27 and directed through an optically permeable sample 28 and, having passed the latter, to the second deflection mirror 20, which reflects it as a light beam 29 directed to the second mirror surface 14 which in turn reflects it as a light beam 30 directed upon a detector 31 arranged in the area of the axis 11.

In contrast, FIG. 1b shows the condition in which the mirror element 12 occupies an exactly point-symmetrical position relative to the axes 11, 23.

As the incoming light beam 10—as mentioned before—is directed symmetrically to the axis 10—it is now split, impinging upon the mirror element 12 on both sides of the edge 17, so that partial beams 26a, 27a, 29a are caused to take the path initially described, via the first deflection mirror 19, through the sample 28 and the second deflection mirror, and back to the second mirror surface 14 and to the detector 31. The other partial light beams 34a, 35a, 36a, which are directed mirror-symmetrically to the before-mentioned light beams 26a, 27a, 29a, relative to the axis 11, follow an analogous path via the fourth mirror surface 16, the fourth deflection mirrors 22, through a reference sample 32, via the third deflection mirror 21 and the third mirror surface 15 to the detector 31.

It appears clearly from FIG. 1b that in the illustrated central position of the mirror element 12, the outgoing light beam 30' is composed by equal shares of partial beams 29a, 36a that have passed the sample 28 to be measured and the reference sample 32, respectively.

Finally, FIG. 1c shows the second mode of operation of the spectrometer according to the invention in which the mirror element 12 has been displaced upwardly, relative to the axis 11, in the direction indicated by arrow 37. In this case, no part of the incoming light beam 10 is guided through the sample 28 to be measured, but the entire beam is directed through the reference sample 32, and the partial beams 34a, 35a, 36a explained in connection with FIG. 1b correspond in this case—as beams 34, 35, 36—to the incoming light beam 10 and/or the outgoing light beam 30", if one disregards the variations introduced by the reference sample 32.

In FIGS. 1b and 1c an additional wedge filter 38 can be seen which is connected with the mirror element 12 via an operative connection 39.

This wedge filter has an additional compensating effect when the reference sample 32 absorbs a much lesser amount of light than the sample 28 to be measured. For, by causing the wedge filter 38 to be entrained by the mirror element 12, as illustrated in FIGS. 1b and 1c, it is ensured that the wedge filter 38 is moved into the light beam 35 at the same rate at which the portion of the incoming light beam 10 which is directed through the reference sample 32 with its lesser absorbing power increases, so that the intensity of the outgoing light beam remains altogether substantially constant, in the defined manner, from 30 in FIG. 1a via 30' in FIG. 1b to 30" in FIG. 1c.

Figure 2:
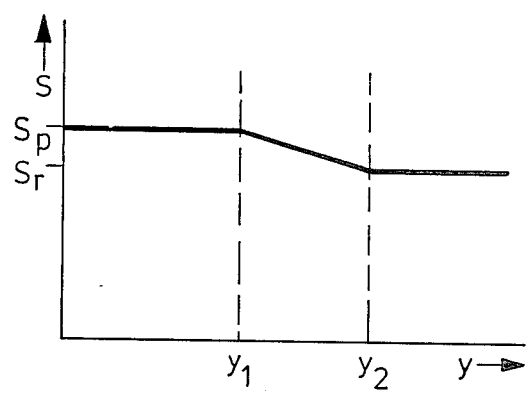
FIG. 2 is a graphic representation of the signal intensity, plotted as a function of the path of displacement of one mirror.

In the diagram of FIG. 2, the curve of the signal intensity S encountered at the detector 31 has been plotted as a function of the path of displacement y, as indicated at the right side of FIGS. 1a to 1c.

When the path of displacement is below $y_1$ and the edge 17 is still outside the incoming light beam 10, as in the illustration of FIG. 1a, then the signal intensity S remains constant at a value $S_p$ which means that it corresponds exactly to the measured value of the sample 28 to be measured.

As the path of displacement increases from $y_1$ to $y_2$, the edge 17 traverses the incoming light beam 10 in the manner shown in FIG. 1b so that—assuming a higher absorbing power of the reference sample 32—the signal intensity S decreases continuously from the value $S_p$ to a value $S_r$, i.e. the value corresponding to the signal of the reference sample 32.

It is obvious from FIG. 2 that the transition between $S_p$ and $S_r$ is very smooth and that the signal intensity S does not drop to zero between $y_1$ and $y_2$, as in the case of the prior art. Accordingly, the detector 31 used has to cope in the example of FIG. 2 only with the signal difference between $S_p$ and $S_r$ which does not present any difficulties given the relatively small difference, measured by the absolute value of the signal S, so that measurements can be carried out in rapid succession. The smooth transition is achieved by the position and design of the optical elements used, in particular by the angle of the rhombic cross-sectional shape of the mirror element 12 and the arrangement and focal points of the deflection and focussing mirrors 19, 20, 2, 22.

Figure 3:
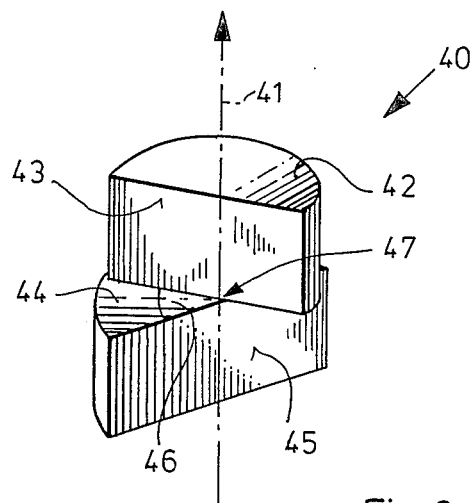
FIG. 3 shows another embodiment of a mirror element of the type suited for use in connection with the present invention.

Finally, FIG. 3 shows another embodiment of a mirror element 40 suited for use in connection with the present invention.

The mirror element 40, comprises in superimposed arrangement—in the direction of a vertical axis 41—a first mirror portion 42 with a first mirror surface 43 and a second mirror portion 44 with a second mirror surface 45. The mirror surfaces 43 and 45 are offset relative to each other by an angle 46 in a manner such that they contact each other only in one point which is passed also by the axis 41.

It is now possible, in a manner similar to that described in detail with reference to FIGS. 1a to 1c, to direct an incoming light beam for example initially upon the first mirror surface 43 so that a first optical path is defined for example for the sample to be measured, due to the angular disposition of the mirror surface 43, relative to the direction of the incoming light beam, and to displace the mirror 40 thereafter vertically to cause the impinging point of the incoming light beam to be displaced over the point 47 to a point on the second mirror surface 45 so that the light beam is directed through the reference sample.

Considering that, conveniently, the incoming light beam is directed vertically to the axis 47, one obtains in this manner a perfect and, again, smooth transition from the one optical path to the other.

It goes without saying that the embodiments of the invention described before can be modified and varied in many different ways. In particular, the invention is not limited to an infrared spectrometer, but may be used also in connection with other optical spectrometers. In addition, it is for the purpose of greater clarity only that the embodiments described use an optically permeable sample arrangement, it being of course also possible to measure reflective samples, or any mixtures of the two types, without departing from the scope of the invention.

We claim:

1. A spectrometer comprising:
   a source of infrared light for emitting a light beam along a first optical axis;
   a detector arranged on said optical axis to receive said light beam;
   a mirror element arranged between said source and said detector, said mirror element having adjacent first and second mirror surfaces, facing said source, said first and second mirror surfaces being inclined to each other, and
   adjacent third and fourth mirror surfaces, facing said detector, said third and fourth mirror surfaces being inclined to each other;
   first light beam guiding means arranged such as to guide in a first mode of operation at least part of said light beam impinging in a first point on said first mirror surface and being reflected therefrom along a first optical path through a first optically permeable sample over to said third mirror surface from which it is reflected onto said detector;

a second light beam guiding means arranged such as to guide in a second mode of operation at least part of said light beam impinging in a second point on said second mirror surface and being reflected therefrom along a second optical path through a second optically permeable sample over to said fourth mirror surface from which it is reflected onto said detector;

actuating means for linearly displacing said mirror element along a second axis, inclined to said first optical axis, such that when fading over from said first to said second mode of operation, the light beam emanating from said light source is continuously displaced from said first point on said first mirror surface and is split into first and second portions transmitted along said first and second paths, respectfully, when passing from said first to said second mirror surface.

2. Spectrometer according to claim 1, wherein said first and second mirror surfaces (13, 16) as well as said third and fourth mirror surfaces (14, 15) abut along an edge (17, 18).

3. Spectrometer according to claim 1, wherein at least the pair of mirror surfaces formed by said first and second mirror surfaces (43, 45) abut in one point (47) only and said mirror element (40) is displaceable along an axis (41) which extends in the planes of both said mirror surfaces and which, therefore, also passes the said one point.

4. Spectrometer according to claim 2 wherein said mirror element (12) exhibits a rhombic cross-section in the direction of the axis of said light beam (10), being provided on each side with a pair of mirror surfaces (13/16, 14/15) and in which in the first mode of operation said light beam (10) is guided from one mirror surface (13) of said one pair of mirror surfaces (13/16) via a first focussing mirror (19), the sample (28) to be measured, a second focussing mirror (20), one mirror surface (14) and finally onto said detector (31), while in the other mode of operation said light beam (10) is guided from the other mirror surface (16) of said one pair of mirror surface (13/16) via a third focussing mirror (21) and the mirror surface (15) of said other pair of mirror surfaces (14/15) onto said detector (31).

5. Spectrometer according to claim 1 further comprising means for moving (39) a wedge filter (38) into the first and second optical paths.

6. Spectrometer according to claim 5, wherein said moving means is arranged for moving said wedge filter (38) in synchronism with mirror element (12).

* * * * *